US011115137B2

(12) United States Patent
Subramanian et al.

(10) Patent No.: US 11,115,137 B2
(45) Date of Patent: Sep. 7, 2021

(54) METHOD AND ELECTRONIC TESTING DEVICE FOR DETERMINING OPTIMAL TEST CASE FOR TESTING USER EQUIPMENT

(71) Applicant: SAMSUNG ELECTRONICS CO., LTD., Suwon-si (KR)

(72) Inventors: Palani Kumar Subramanian, Bengaluru (IN); Kumud Sinha, Bengaluru (IN); Tushar Vrind, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 16/665,145

(22) Filed: Oct. 28, 2019

(65) Prior Publication Data
US 2021/0036788 A1 Feb. 4, 2021

(30) Foreign Application Priority Data

Aug. 2, 2019 (IN) .............................. 201941031342

(51) Int. Cl.
*H04W 24/08* (2009.01)
*H04B 17/15* (2015.01)
*H04B 17/29* (2015.01)

(52) U.S. Cl.
CPC ............. *H04B 17/15* (2015.01); *H04B 17/29* (2015.01)

(58) Field of Classification Search
CPC .................................................. G06F 11/3688
See application file for complete search history.

(56) References Cited

U.S. PATENT DOCUMENTS

| | | | |
|---|---|---|---|
| 7,552,361 B2 | 6/2009 | Galler et al. | |
| 8,788,892 B2 | 7/2014 | Barker, Jr. et al. | |
| 9,268,672 B1 | 2/2016 | Gupta | |
| 9,642,028 B2 | 5/2017 | Koskinen et al. | |
| 2009/0204591 A1* | 8/2009 | Kaksonen | G06F 11/3684 |
| 2010/0287534 A1* | 11/2010 | Vangala | G06F 11/3612 717/124 |
| 2012/0088457 A1* | 4/2012 | Johansson | H04W 24/10 455/67.11 |
| 2012/0088498 A1 | 4/2012 | Xiao et al. | |

(Continued)

OTHER PUBLICATIONS

Anonymous, "Keysight Virtual Drive Testing Toolset", Keysight Technologies, 2015, retrieved from: https://www.keysight.com/en/pc-2697342/anite-virtual-drive-testing-toolset?cc=IN&lc=eng, (3 pages total).

(Continued)

*Primary Examiner* — Cindy Trandai
(74) *Attorney, Agent, or Firm* — Sughrue Mion, PLLC

(57) ABSTRACT

A method is provided. The method includes determining, in a determination by an electronic testing device, one or more locations in a cellular network where a test case is to be executed, a time at which the test case is to be executed at the one or more locations, a number of times the test case is to be executed at the one or more locations, or a type of a test equipment on which the test case is to be executed. A test context for testing a user equipment is determined based on a result of the determination. An optimal test case is determined from a test case repository, based on the test context, and the optimal test case is executed.

19 Claims, 6 Drawing Sheets

(56) References Cited

U.S. PATENT DOCUMENTS

| | | | |
|---|---|---|---|
| 2013/0111267 A1 | 5/2013 | Beryoza et al. | |
| 2013/0114446 A1* | 5/2013 | Liu | H04W 24/10 370/252 |
| 2014/0019939 A1* | 1/2014 | Wiggers | G06F 8/30 717/124 |
| 2014/0237450 A1* | 8/2014 | Levy | G06F 11/3684 717/124 |
| 2014/0245264 A1 | 8/2014 | Bartley et al. | |
| 2014/0380279 A1 | 12/2014 | Bartley et al. | |
| 2015/0026664 A1* | 1/2015 | Bartley | G06F 11/3676 717/124 |
| 2015/0189525 A1* | 7/2015 | Schmidt | H04W 24/08 455/436 |
| 2015/0215798 A1 | 7/2015 | Choi et al. | |
| 2015/0236799 A1* | 8/2015 | Lee | H04B 17/19 455/425 |
| 2016/0072730 A1* | 3/2016 | Jubran | H04L 47/822 709/224 |
| 2017/0068614 A1 | 3/2017 | Jayaraman et al. | |
| 2017/0344467 A1* | 11/2017 | Yadav | G06F 11/3664 |
| 2018/0035307 A1* | 2/2018 | Mahimkar | H04L 41/147 |
| 2018/0357143 A1* | 12/2018 | Panambur | G06F 11/2289 |
| 2020/0242015 A1* | 7/2020 | Catt | G06F 11/3664 |
| 2020/0242591 A1* | 7/2020 | Sevindik | G06Q 20/32 |

OTHER PUBLICATIONS

Anonymous, "Field-to-Lab", 2019, Anritsu, Test and Measurement, retrieved from: https://www.anritsu.com/en-US/test-measurement/solutions/channel-emulator/ftl, (1 page total).

Mahdi Noorian et al., "Machine Learning-based Software Testing: Towards a Classification Framework", 2011, Proceedings of the 23$^{rd}$ International Conference on Software Engineering and Knowledge Engineering (SEKE'2011), retrieved from: https://www.ee.ryerson.ca/~bagheri/papers/seke11.pdf, (6 pages total).

Vassilis Dalakas, "Automate Minimization of Drive Tests for QoE Provisioning: The Case of Coverage Mapping", 2015, International Journal of Computer Applications. vol. 126—No. 8, retrieved from: https://www.researchgate.net/publication/281863294_Automate_Minimization_of_Drive_Tests_for_QoE_Provisioning_The_Case_of_Coverage_Mapping, pp. 1-6 (6 pages total).

* cited by examiner

METHOD AND ELECTRONIC TESTING DEVICE FOR DETERMINING OPTIMAL TEST CASE FOR TESTING USER EQUIPMENT

CROSS REFERENCE TO RELATED APPLICATION

This Application claims priority from Indian Patent Application No. 201941031342, filed in the Indian Patent Office on Aug. 2, 2019 in the Indian Patent Office, the entire contents of which are herein incorporated by reference.

BACKGROUND

1. Field

The present disclosure relates to hardware and software testing methods, and more specifically to a method and electronic testing device for determining an optimal test case for testing a User Equipment (UE).

2. Description of Related Art

A best practice of a software/hardware development cycle mandates that a software/hardware should be thoroughly tested to identify and correct problems before releasing the software/hardware as a product. A software/hardware testing process often includes testing the software/hardware for multiple scenarios referred to as test cases. Executing each test case takes considerable time to complete the software/hardware testing process, and the test cases must be repeated even if only small changes are made to the software.

An optimal test case may be manually selected or automatically selected. However, manual selection is prone to human-errors, is time consuming for the tester, and demands a domain knowledge for the tester.

Related art systems that automatically identify test cases are insufficient to ensure that the test case is optimum for testing cellular communication protocol software/hardware.

SUMMARY

It is an aspect to provide a method and electronic testing device for determining an optimal test case for testing a user equipment (UE).

It is another aspect to determine one or more locations where a test case is to be executed, a time at which the test case is to be executed at the one or more locations, a number of times the test case is to be executed at the one or more locations, and a type of a test equipment on which the test case is to be executed.

It is yet another aspect to determine a test context for testing the UE based on the one or more locations where the test case is to be executed, the time at which the test case is to be executed at the one or more locations, the number of times the test case is to be executed at the one or more locations, and the type of the test equipment.

It is yet another aspect to determine the optimal test case from a test case repository for testing the UE based on the test context.

It is yet another aspect to execute the optimal test case for testing the UE.

It is yet another aspect to optimize the test case repository based on test feedback.

According to an aspect of an embodiment, there is provided a method comprising determining, in a determination by an electronic testing device, one or more locations in a cellular network where a test case is to be executed, a time at which the test case is to be executed at the one or more locations, a number of times the test case is to be executed at the one or more locations, and/or a type of a test equipment on which the test case is to be executed; determining, by the electronic testing device, a test context for testing a user equipment based on a result of the determination; determining, by the electronic testing device from a test case repository, an optimal test case for testing the user equipment, based on the test context; and executing, by the electronic testing device, the optimal test case to test the user equipment.

Accordingly another aspect of an embodiment, there is provided an electronic testing device comprising a memory; and a processor, coupled to the memory, and in conjunction with the memory, configured to determine, in a determination, one or more locations in a cellular network where a test case is to be executed, a time at which the test case is to be executed at the one or more locations, a number of times the test case is to be executed at the one or more locations, and a type of a test equipment on which the test case is to be executed; determine a test context for testing the user equipment based on a result of the determination; determine, from a test case repository, an optimal test case for testing the user equipment, based on the test context; and execute the optimal test case for testing the user equipment.

According to yet another aspect of an embodiment, there is provided a method executed by a processor in conjunction with a memory, the method comprising randomly selecting a modified program code from among a plurality of program code, the program code being for executing cellular communication protocol software on a user equipment that is to operate in a cellular network; determining one or more geographic locations within the cellular network at which a test case is to be executed, and a number of first iterations; determining one or more test equipment on which the test case is to be executed, and a number of second iterations; and executing the test case with respect to the selected modified program code for the number of first iterations at each geographic location for the number of second iterations on each test equipment to test the user equipment These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

The above and other aspects will be better understood from the following description with reference to the drawings, in which.

DETAILED DESCRIPTION

Figure 1A:
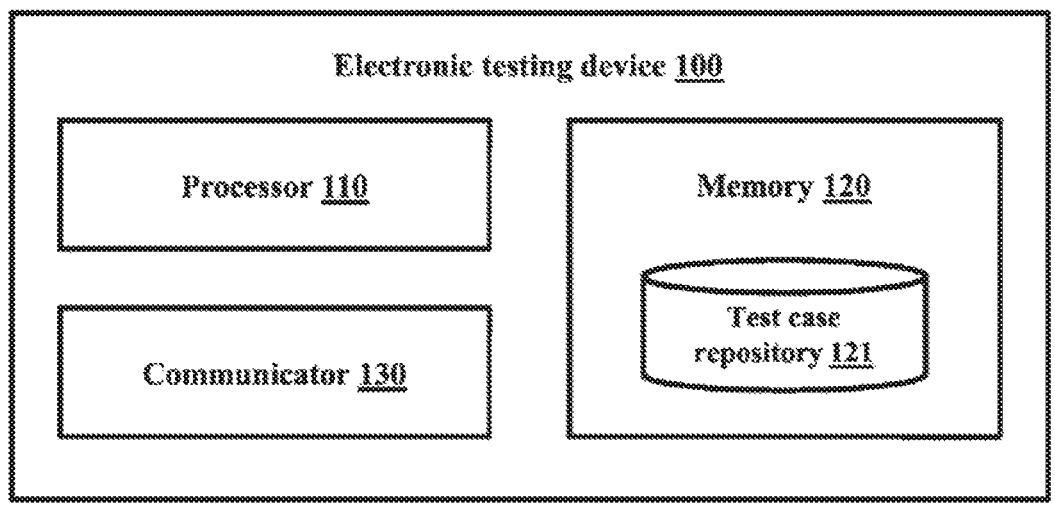
FIG. 1A is a block diagram of an electronic testing device for determining an optimal test case for testing a UE, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

In the accompanying drawings, like reference letters/numbers indicate corresponding parts in the various figures, unless otherwise noted. Moreover, in this specification, the phrase "at least one of A and B" includes "only A", "only B", and "both A and B".

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

A best practice of a software/hardware development cycle mandates that a software/hardware should be thoroughly tested before releasing the software/hardware as a product. A tester identifies problems in the software/hardware that need correction by testing the software/hardware. A software/hardware testing process often includes testing the software/hardware for multiple scenarios referred to as test cases, where each test case has a set of test data, pre-conditions, expected results and post-conditions. The test cases are executed by existing systems to identify whether the software/hardware is operating as intended by the tester. Executing each test case takes considerable time to complete the software/hardware testing process. During the software/hardware development cycle, lines of program code of the software/hardware are often modified for correcting a bug in the program code or optimizing the program code or adding a new feature to the program code. Even if the modification made to the lines of program code was very small, the entire software/hardware needs to typically be re-submitted for the software/hardware testing process by running all the test cases.

Executing all the test cases to test the modified software/hardware is not feasible, due to time and resource constraints in performing the software/hardware testing process. A related art method includes manually selecting an optimal test case by the tester for executing the optimal test case, where the tester needs to identify the optimal test case. However, a manual selection of the optimal test case is prone to human-errors and is time consuming for the tester to identify the optimal test case. Further, the manual selection of the optimal test case demands a domain knowledge for the tester. Automated software/hardware testing is one effective approach for testing the software/hardware.

In automated software/hardware testing, related art systems automatically identify the test cases for testing the software/hardware based on a code coverage report and a change list, where change list provides information regarding a modification in the lines of program code. However, the code coverage report and the change list are insufficient to ensure that the test case is optimum for testing a cellular communication protocol software/hardware. Since cellular networks are widely deployed based on cell planning, the test cases should be executed by considering a density of users in a location at a particular time of a day and various channel conditions such as a channel state information, a channel capacity, etc. In other words, the test case may be run with respect to different geographic locations within the cellular network, with different locations generating different results based on the density of users in the location, the time of day, channel conditions, channel capacity, etc., some or all of which may be different at different locations within the cellular network. A common network access stratum of the cellular network is used for all the Radio Access Technologies (RATs) such as Second Generation (2G) cellular network, Third Generation Frequency Division Duplex (3G FDD) cellular network, Third Generation Time Division Duplex (3G TDD) cellular network, Code-Division Multiple Access (CDMA) cellular network, Long-Term Evolution (LTE) cellular network and Fifth Generation (5G) cellular network and so on. Therefore, identifying the optimal test case for the modification in the lines of program code of the cellular communication protocol software/hardware by incorporating selection of the location, the various channel conditions and the RATs in the cellular network is challenging.

Accordingly, the embodiments herein provide a method for determining an optimal test case for testing a UE. The method includes determining, by an electronic testing device, at least one of one or more locations where a test case is to be executed, a time at which the test case is to be executed at the one or more locations, a number of times the test case is to be executed at the one or more locations, and a type of a test equipment on which the test case is to be executed. Further, the method includes determining, by the electronic testing device, a test context for testing the UE based on at least one of the one or more locations where the test case is to be executed, the time at which the test case is to be executed at the one or more locations, the number of times the test case is to be executed at the one or more locations, and the type of the test equipment. Further, the method includes determining, by the electronic testing device, the optimal test case from a test case repository for testing the UE based on the test context. Further, the method includes executing, by the electronic testing device, the optimal test case for testing the UE.

Unlike related art methods and systems, the electronic testing device according to the embodiments disclosed herein determines the optimal test case for testing a hardware/software used for cellular communication. The electronic testing device determines the optimal test case based on the location in a cellular network where the test case is to be executed, the time at which the test case is to be executed, the number of times the test case is to be executed, RATs in a cellular network, profiling parameters, code coverage metrics, debug logs emanating after the execution of each test case and a change list. Therefore, the optimal test case is accurate in validating modifications of the hardware/software.

Referring now to the drawings, and more particularly to FIGS. 1 through 5, there are shown various embodiments.

FIG. 1 is a block diagram of an electronic testing device for determining an optimal test case for testing a UE, according to an embodiment as disclosed herein. An electronic testing device (100) may be, but is not limited to, a smart phone, a tablet computer, a personal computer, a desktop computer, a Personal Digital Assistance (PDA) or the like. In some embodiments, the electronic testing device (100) includes a processor (110), a memory (120) and a communicator (130), where the processor (110) is coupled to the memory (120). The memory (120) includes a test case repository (121), where test cases store in the test case repository (121)

The processor (110) may be configured to determine at least one test case parameter. The test case parameter includes one or more geographical locations where a test case is to be executed, a time (e.g. 6 PM) at which the test case is to be executed at the one or more locations, a number of times/iterations (e.g. 25 times) the test case is to be executed at the one or more locations, and a type of a test equipment on which the test case is to be executed. For example, the location may be a location in a cellular network. The location may be, but is not limited to, a cricket gallery, an airport, a road junction, etc. The test equipment may be a network simulator. For example, the type of the test equipment may be, but is not limited to, a vendor (e.g. Agilent, Anritsu, Rohde & Schwarz, etc.) of the test equipment, the UE that communicates only to a single RAT (e.g. 4G cellular network), the UE that communicates to multiple RATs (e.g. a 2G cellular network, a 3G TDD cellular network, the 4G cellular network and a 5G cellular network), etc. In some embodiments, the processor (110) may be configured to determine similar test cases based on an early learning of a test result (i.e. success or fail) obtained during an execution of each test case. In some embodiments, the processor (110) may be configured to determine a user density and a network load at the time of the day at which the test case is to be executed at the one or more locations.

In some embodiments, the test case parameter may be determined based on at least one of a code coverage metric, a profiling parameter, channel conditions, platform metrics, co-ordinates of the one or more locations and debug logs from at least one of, but not limited to, the UE, a simulator and a network and any other logging methodologies. For example, the channel conditions may be, but are not limited to, channel state information, channel capacity, etc. For example, the platform metrics may be, but are not limited to, a Read-Only (RO) data, a Read-Write (RW) data, a Zero Initialized (ZI) data, a Million Instructions Per Second (MIPS) count, a heap etc. In some embodiments, the profiling parameter comprises a number of accesses to the RO data, a number of accesses to the RW data, a number of accesses to the ZI data, a CPU cycle count, a profiling in time and/or a memory usage.

In some embodiments, the processor (110) may be configured to generate the code coverage metric (i.e. code coverage report) for executing the test case, one of:
(a) at different locations,
(b) at same location but at different at times of the day,
(c) at same location but different number of times,
(d) with a different combination of (a), (b) and (c),
(e) with different test equipment,
(f) with the same test equipment but different number of times, and
(g) a combination of (e) and (f).

The method may be used by the electronic testing device (100) to choose the test case with one amongst (a) to (g) for a change list. Therefore, the test case may accurately or probabilistically exercise and execute a modified program code before releasing the UE to the customer.

The processor (110) may be configured to determine a test context for testing the UE based on at least one of A-D, where A denotes the one or more locations where the test case is to be executed, B denotes the time at which the test case is to be executed at the one or more locations, C denotes the number of times the test case is to be executed at the one or more locations, and D denotes the type of the test equipment. That is, the processor (110) may be configured to determine a test context for testing the UE based on one or more locations where the test case is to be executed, the time at which the test case is to be executed at the one or more locations, the number of times the test case is to be executed at the one or more locations, and/or the type of the test equipment.

The processor (110) may be configured to determine the optimal test case from the test case repository (121) for testing the UE based on the test context. In some embodiments, the processor (110) may be configured to receive a reference program code with the test context. The processor (110) may be configured to determine the optimal test case from the test case repository (121) for testing the UE based on the reference program code with the test context. In some embodiments, the processor (110) may be configured to perform a maximum depth analysis on the reference program code using the test context for determining the optimal test case.

The processor (110) may be configured to execute the optimal test case for testing the UE. The processor (110) may be configured to receive a test feedback corresponding to the execution of the optimal test case. In some embodiments, the test feedback includes the debug logs.

In some embodiments, the processor (110) may be configured to check whether a range of input values in the code coverage metric is exercised by at least one of the test equipment, the simulator and the network, while executing the optimal test case. The processor (110) may be configured to determine input values in the code coverage metric which are not exercised by at least one of the test equipment, the simulator and the network, when at least one of the test equipment, the simulator and the network does not exercise the range of the input values. Further, the processor (110) may be configured to receive the test feedback including the input values which are not exercised by at least one of the test equipment, the simulator and the network.

In some embodiments, in addition to executing the optimal test case for verifying the change list obtained due to a change in the reference program code, the processor (110) may be configured to execute other test cases for verifying the change in the reference program code. Execution of the other test cases for verifying the change in the reference program code includes exercising another range of the input values or output values or multiple log points and values of the profiling parameters for the other test cases such as RO, RW and ZI. Further, the processor (110) may be configured to identify the range of values which are recovered from the debug logs as the test case feedback.

The processor (110) may be configured to optimize the test case repository (121) based on the test feedback. In some embodiments, the processor (110) may be configured to generate a new range of the input values to the code coverage metric for optimizing the test case repository (121) based on the test feedback.

In some embodiments, the processor (110) may be configured to perform cross reference of the debug logs, which have a range of the output values. For example, the electronic testing device (100) may execute the test case-1 and the resulting debug log may include a first range of the output values. The electronic testing device (100) may execute the test case-2 and resulting the debug log may include a second range of the output values, even though a same code sequence is executed for both the test case-1 and the test case-2. Therefore, the electronic testing device (100) may identify the test cases to improve a data coverage by choosing the test case-1 as well as the test case-2 for the change list.

In some embodiments, the processor (110) may be configured to perform the cross reference of the profiling parameter for identifying the optimal test case. In an example, when the change list is submitted, a submitter can verifies the change list towards the test cases using the electronic testing device (100) for identifying the optimal test case.

In some embodiments, the processor (110) may be configured to infer the profiling parameter and determine the test cases that are suitable to test, for increasing profiling values. Further, the processor (110) may be configured to verify timing drifts obtained before and after the modification of the program code and/or before verifying memory usage peaks. Therefore, the electronic testing device (100) is able to determine whether a new software or a modified software is meeting a desired performance.

The processor (110) may be configured to execute instructions stored in the memory (120). The memory (120) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory (120) may, in some embodiments, be considered a non-transitory storage medium. The term "non-transitory" may indicate that the storage medium is not embodied in a carrier wave or a propagated signal. However, the term "non-transitory" should not be interpreted that the memory (120) is non-movable. In some embodiments, the memory (120) that is non-transitory may be configured to store larger amounts of information than the memory (120) that include non-volatile storage elements. In some embodiments, a non-transitory storage medium may store data that can, over time, change (e.g., in Random Access Memory (RAM) or cache). The communicator (130) may be configured to communicate internally between hardware components in the electronic testing device (100). In some embodiments, the communicator alternatively or additionally may be configured to communicate wirelessly with a cellular network.

Although the FIG. 1A shows the hardware components of the electronic testing device (100), it is to be understood that other embodiments are not limited thereto. In some embodiments, the electronic testing device (100) may include less or more number of components. Further, the labels or names of the components are used only for illustrative purpose and are not meant to be limiting. One or more components may be combined together to perform same or substantially similar function for determining the optimal test case for testing the UE.

Figure 1B:
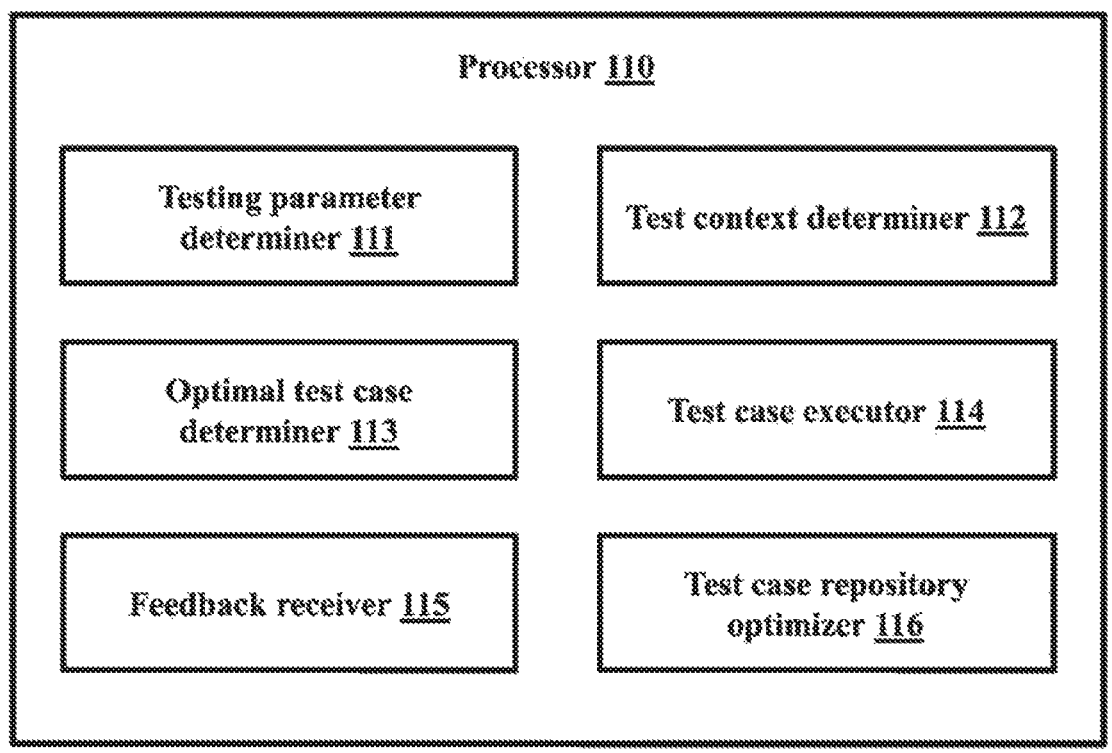
FIG. 1B is a block diagram of a processor in the electronic testing device for executing the optimal test case, according to an embodiment as disclosed herein.

FIG. 1B is a block diagram of a processor in the electronic testing device for executing the optimal test case, according to an embodiment as disclosed herein. In some embodiments, the processor (110) may include a testing parameter determiner (111), a test context determiner (112), an optimal test case determiner (113), a test case executor (114), a feedback receiver (115) and a test case repository optimizer (116). The testing parameter determiner (111) determines at least one test case parameter.

The testing parameter determiner (111) may determine the similar test cases based on the early learning of the test result (i.e. success or fail) obtained during the execution of each test case. In some embodiments, the testing parameter determiner (111) may determine the user density and the network load at the time of the day at which the test case is to be executed at the one or more locations. In some embodiments, the testing parameter determiner (111) may infer the profiling parameter. Further, the optimal test case determiner (113) may determine the test cases that are able to test for increasing profiling values.

The test context determiner (112) may determine the test context for testing the UE based on at least one of A-D, where A denotes the one or more locations where the test case is to be executed, B denotes the time at which the test case is to be executed at the one or more locations, C denotes the number of times the test case is to be executed at the one or more locations, and D denotes the type of the test equipment.

The optimal test case determiner (113) may determine the optimal test case from the test case repository (121) for testing the UE based on the test context. In some embodiments, the optimal test case determiner (113) may receive the reference program code with the test context. The optimal test case determiner (113) may determine the optimal test case from the test case repository (121) for testing the UE based on the reference program code with the test context. In some embodiments, the optimal test case determiner (113) may perform the maximum depth analysis on the reference program code using the test context for determining the optimal test case.

The test case executor (114) may execute the optimal test case for testing the UE. In some embodiments, the test case executor (114) may check whether the range of input values in the code coverage metric is exercised at least one of the test equipment, the simulator and the network, while executing the optimal test case. In some embodiments, in addition to executing the optimal test case for verifying the change list obtained due to the change in the reference program code, the test case executor (114) may execute the other test cases for verifying the change in the reference program code. In some embodiments, the test case executor (114) may perform the cross reference of the profiling parameter for identifying the optimal test case.

The test case executor (114) may determine input values in the code coverage metric which are not exercised by at least one of the test equipment, the simulator and the network, when at least one of the UE, the simulator and the network does not exercise the range of the input values. The feedback receiver (115) may receive the test feedback that includes the input values which are not exercised by at least one of the test equipment, the simulator and the network. In some embodiments, the feedback receiver (115) may receive the test feedback corresponding to the execution of the optimal test case. In some embodiments, the test feedback may include the debug logs.

The test case repository optimizer (116) may identify the range of values which are covered from the debug logs as the test case feedback. The test case repository optimizer (116) may optimize the test case repository (121) based on the test feedback. In some embodiments, the test case repository optimizer (116) may generate the new range of the input values to the code coverage metric for optimizing the test case repository (121) based on the test feedback. In some embodiments, the test case repository optimizer (116) may perform the cross reference of the debug logs, which have the range of the output values. The test case repository optimizer (116) may generate the code coverage metric (i.e. code coverage report) for executing the test case, one of:
  (a) at different locations,
  (b) at same location but at different at times of the day,
  (c) at same location but different number of times,
  (d) with the different combination of (a), (b) and (c),
  (e) with different test equipment,
  (f) with the same test equipment but different number of times, and
  (g) a combination of (e) and (f).

In some embodiments, the test case repository optimizer (116) may verify timing drifts obtained before and after the modification of the program code and/or before verifying memory usage peaks.

Although the FIG. 1B shows the hardware components of the processor (110), it is to be understood that other embodiments are not limited thereto. In other embodiments, the processor (110) may include less or more number of components. Further, the labels or names of the components are used only for illustrative purpose and are not meant to be limiting. One or more components may be combined together to perform same or substantially similar function for determining the optimal test case for testing the UE.

Figure 2:
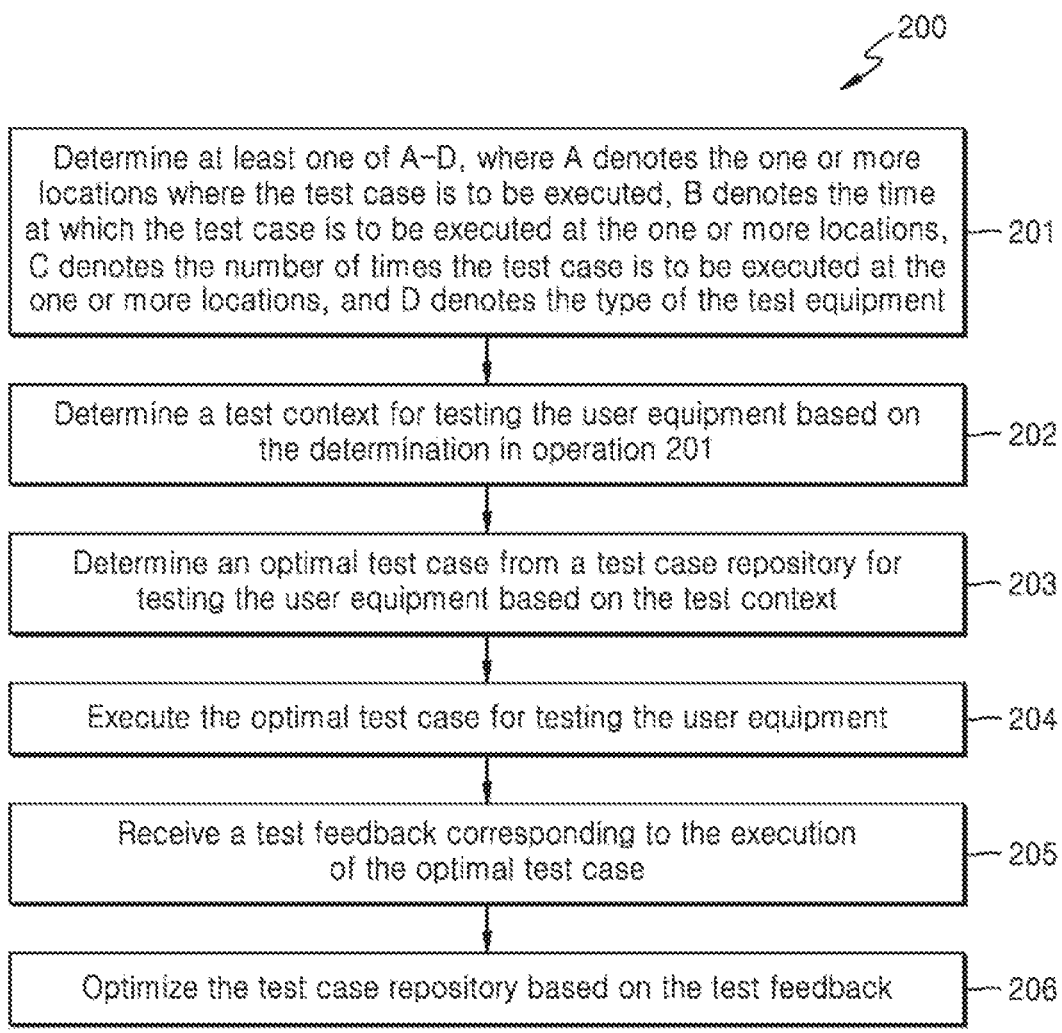
FIG. 2 is a flow diagram illustrating a method for determining the optimal test case for testing the UE, according to an embodiment as disclosed herein.

FIG. 2 is a flow diagram illustrating an example of a method for determining the optimal test case for testing the UE, according to an embodiment as disclosed herein. In the method 200, at operation 201, the method includes determining at least one of A-D, where A denotes the one or more locations where the test case is to be executed, B denotes the time at which the test case is to be executed at the one or more locations, C denotes the number of times the test case is to be executed at the one or more locations, and D denotes the type of the test equipment. In some embodiments, the method allows the testing parameter determiner (111) to determine the at least one of A-D, where A denotes the one or more locations where the test case is to be executed, B denotes the time at which the test case is to be executed at the one or more locations, C denotes the number of times the test case is to be executed at the one or more locations, and D denotes the type of the test equipment.

At operation 202, the method includes determining the test context for testing the UE based the determination in operation 201. For example, the method may include determining the test context for testing the UE based on the at least one of A-D, where A denotes the one or more locations where the test case is to be executed, B denotes the time at which the test case is to be executed at the one or more locations, C denotes the number of times the test case is to be executed at the one or more locations, and D denotes the type of the test equipment. In some embodiments, the method allows the test context determiner (112) to determine the test context for testing the UE based on the at least one of A-D, where A denotes the one or more locations where the test case is to be executed, B denotes the time at which the test case is to be executed at the one or more locations, C denotes the number of times the test case is to be executed at the one or more locations, and D denotes the type of the test equipment.

At operation 203, the method includes determining the optimal test case from the test case repository (121) for testing the UE based on the test context. In some embodiments, the method allows the optimal test case determiner (113) to determine the optimal test case from the test case repository (121) for testing the UE based on the test context. At operation 204, the method includes executing the optimal test case for testing the UE. In some embodiments, the method allows the test case executor (114) to execute the optimal test case for testing the UE. At operation 205, the method includes receiving the test feedback corresponding to the execution of the optimal test case. In some embodiments, the method allows the feedback receiver (115) to receive the test feedback corresponding to the execution of the optimal test case. At operation 206, the method includes optimizing the test case repository (121) based on the test feedback. In some embodiments, the method allows the test case repository optimizer (116) to optimize the test case repository (121) based on the test feedback.

The various actions, acts, blocks, steps, or the like in the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

Figure 3:
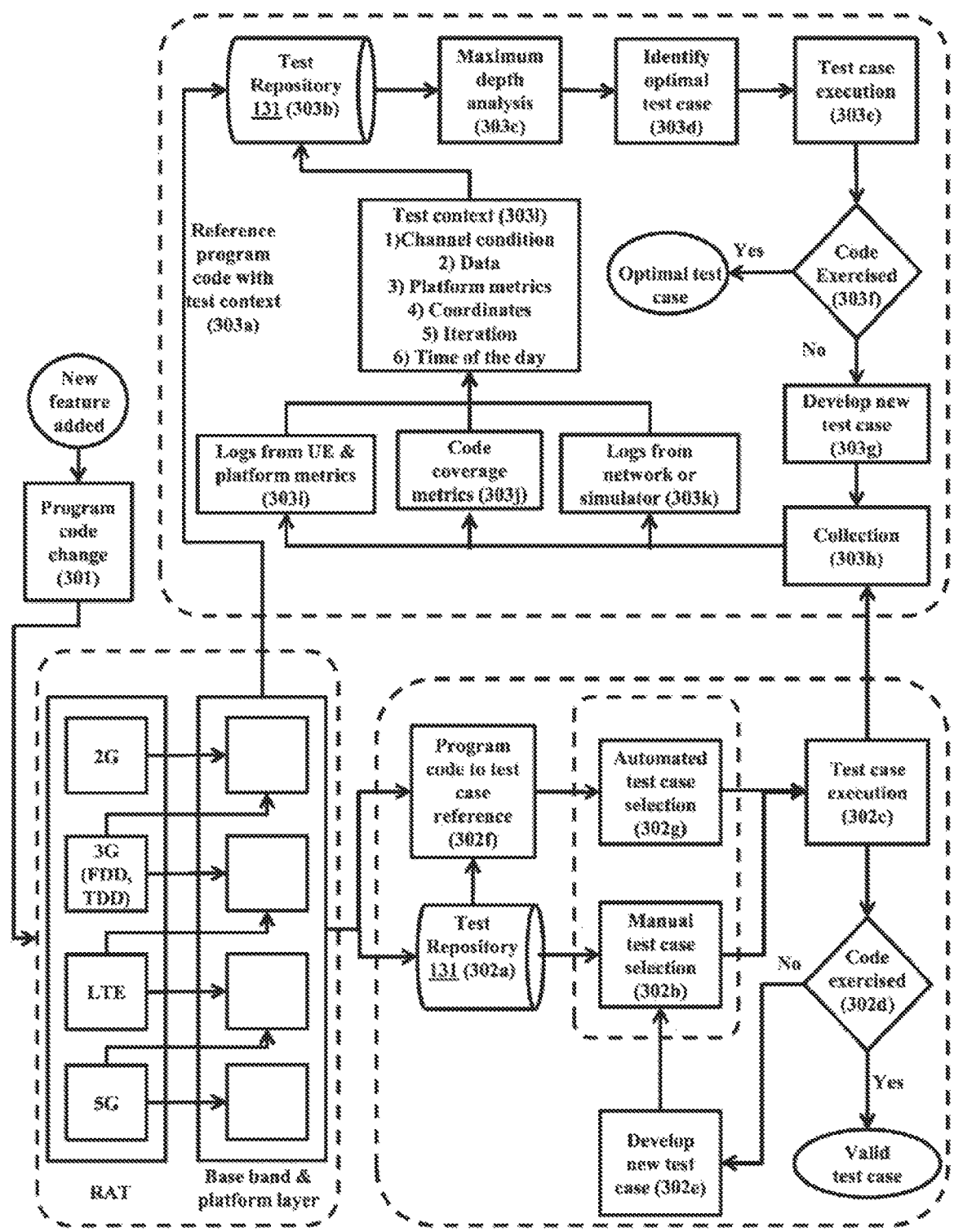
FIG. 3 is schematic diagram illustrating an example of steps in determining the optimal test case by the electronic testing device, according to an embodiment as disclosed herein.

FIG. 3 schematic diagram illustrating steps in determining the optimal test case by the electronic testing device, according to an embodiment as disclosed herein. The program code of the UE is changed (301) due to adding a new feature to the program code. The RAT includes the 2G cellular network, the 3G cellular network (FDD, TDD), LTE cellular network and the 5G cellular network, where the RATs are connected to a baseband and platform layer. The test repository (131) receives (302a) the program code with the change list, information regarding the RAT from the baseband and platform layer.

The steps include selecting (302b) a manual test case by a tester by using the information regarding the RAT and the program code with the change list. The steps include executing (302c) the selected test case by the electronic testing device (100). The steps include determining (302d), by the electronic testing device (100), whether a modification of the program code is exercised during the execution of the selected test case. Further, the test case determines as a valid test case by the electronic testing device (100), when the modification of the program code is exercised. The steps include developing (302e) a new test case for execution by the electronic testing device (100), in response to determining that the modification of the program code is not exercised.

The steps include generating (302f, by the electronic testing device (100), a test case reference using the program code with the change list, the test cases in the test repository (131) and the information regarding the RAT obtained from the baseband and platform layer. Further, the steps include automatically selecting (302g) the test case for execution based on the reference of test case by the electronic testing device (100).

Additionally, as described above, the electronic testing device (100) receives (303a) the reference program code with the test context from the baseband and platform layer, where the baseband and platform layer determines the reference program code with the test context based on the program code with the change list and the information regarding the RATs. Further, the steps include selecting (303b), by the electronic testing device (100), the test cases from the test case repository (121) based on the reference program and the test context to perform maximum depth analysis. Further, the steps include performing (303c), by the electronic testing device (100), the maximum depth analysis on the test cases available in the test repository (131) using the reference program code with the test context. Further, the steps include identifying (303d) the test case for testing the UE based on the maximum depth analysis on the test cases by the electronic testing device (100). The steps include executing (303e) the identified test case by the electronic testing device (100).

The steps include determining (303f, by the electronic testing device (100), whether the modification of the program code is exercised during the execution of the identified test case. Further, the test case determines the optimal test case, by the electronic testing device (100), when the modification of the program code is exercised. The steps include developing (303g) the new test case for execution by the electronic testing device (100), in response to determining that the modification of the program code is not exercised. Further, the steps include collecting (303h) the test cases that obtains during the step 302c and the new test case developed in the step 303g by the electronic testing device (100). Further, the steps include generating (303i), by the electronic testing device (100), the platform metrics and the debug logs from the UE based on the collected test cases. Further, the steps include generating (303j) the code coverage metrics based on the collected test cases by the electronic testing device (100).

Further, the steps include generating (303k) the debug logs from the network and the simulator based on the collected test cases by the electronic testing device (100). Further, the steps include generating (303l), by the electronic testing device (100), the test context including the channel condition, an inbound data, and an outbound data, a data range, the platform metrics, the location coordinates, the number of interactions and the time of the day, based on the platform metrics, the debug logs and the code coverage metrics.

Figure 4:
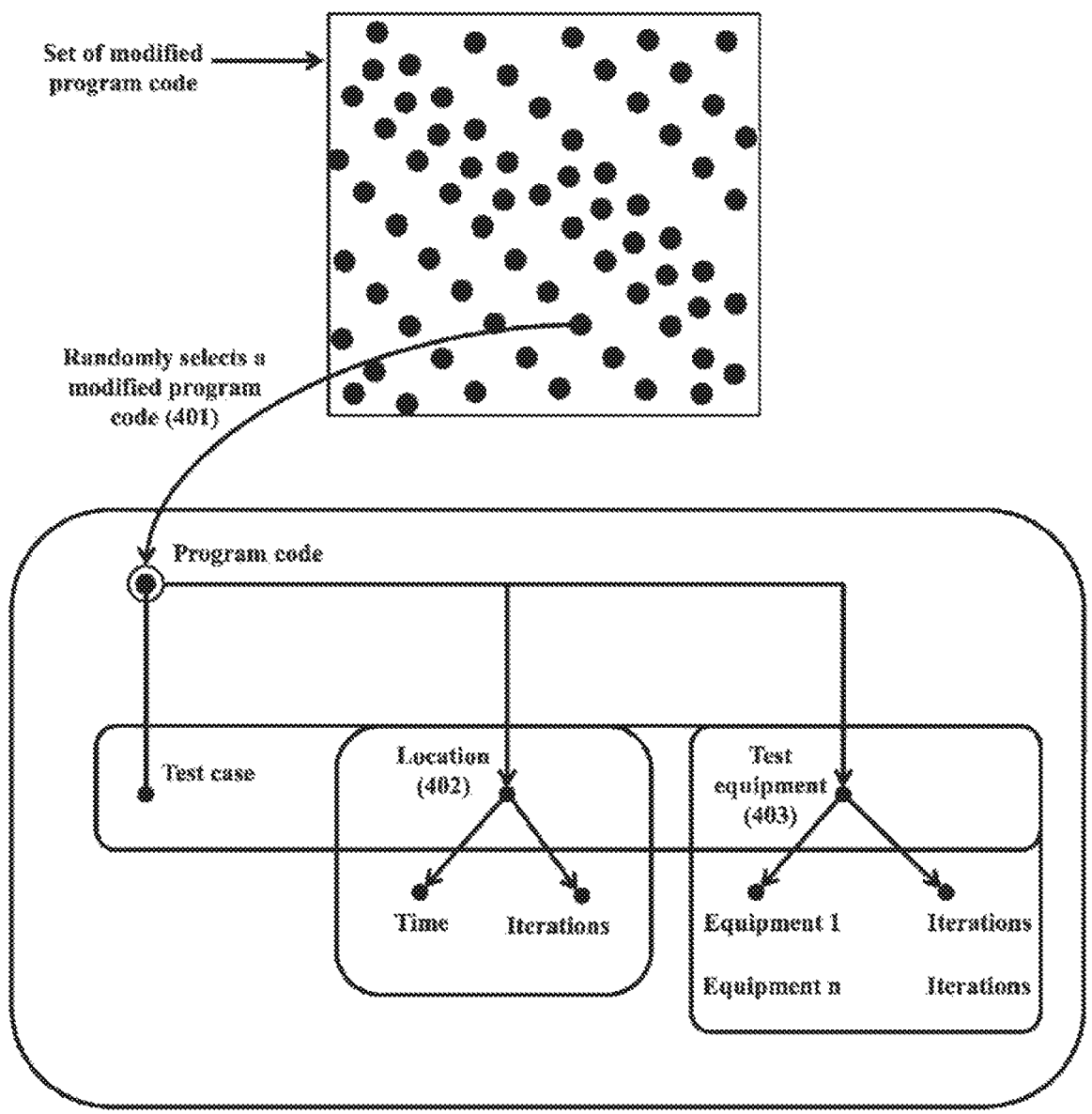
FIG. 4 is a flow diagram illustrating an example of steps in determining the optimal test case by using a set of discrete program codes, according to an embodiment as disclosed herein.

FIG. 4 is illustrates an example scenario of selecting a modified program code from a set of modified program codes by the electronic testing device (100) for determining the optimal test case, according to an embodiment as disclosed herein. The electronic testing device (100) selects (401) the modified program code randomly from the set of modified program code for determining the optimal test case for testing the UE. The electronic testing device (100) determines (402) the one or more locations where the test case is to be executed. Further, the electronic testing device (100) selects the time of the day and the number of iterations for executing the test case at the one or more locations.

Further, the electronic testing device (100) selects the time of the day and the number of iterations for executing the test case at the one or more locations. The electronic testing device (100) selects (403) 'n' number of test equipment to be tested based on the vendor of the equipment and a test environment in which the testing to be performed. Further, the electronic testing device (100) determines the number of iterations for executing the test case for each of the UEs. The test case selected by the electronic testing device (100) by performing the steps 401-403 is more precise in the execution of the modified source code, as compared to related art methods, which improves a quality of a software of the UE.

Figure 5:
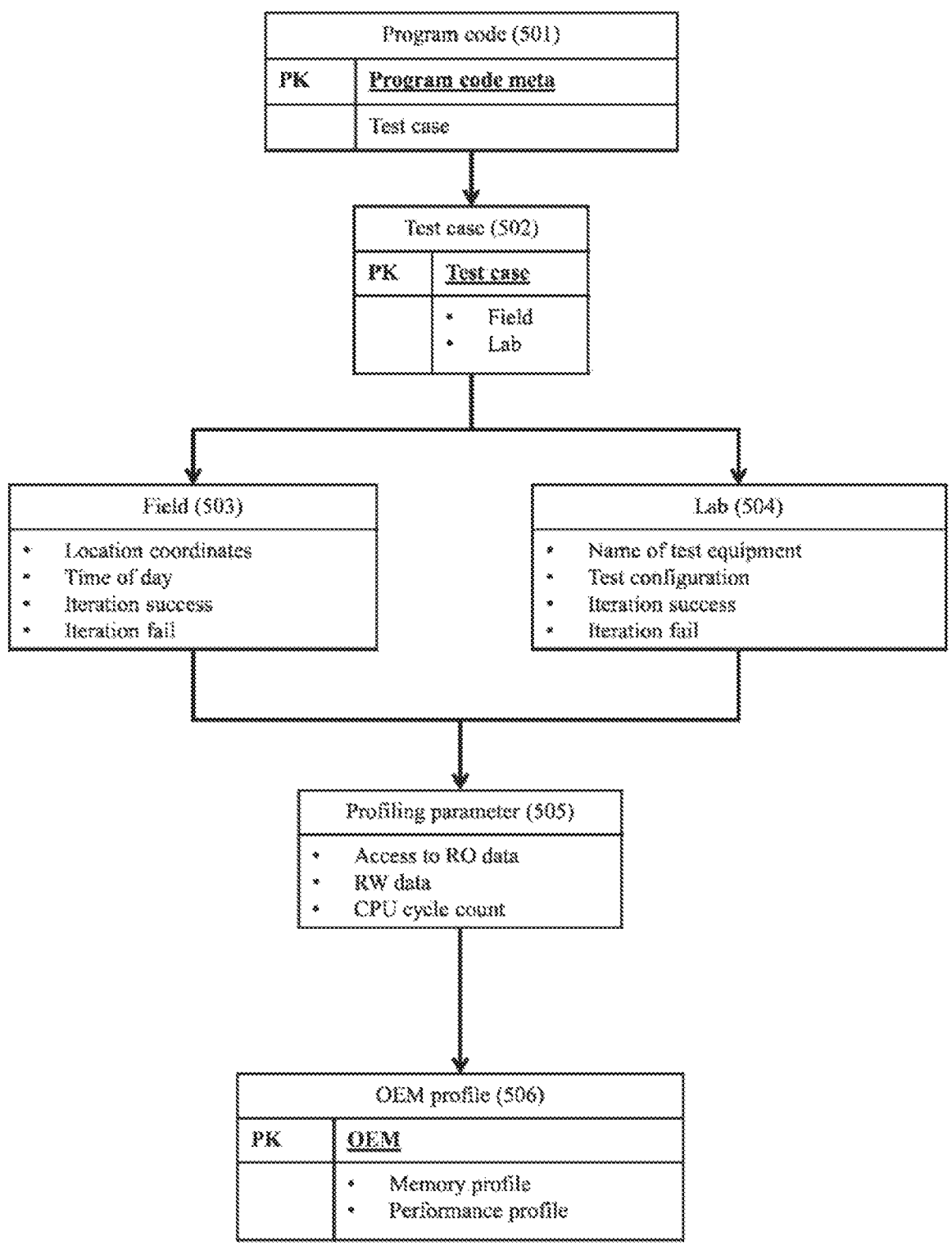
FIG. 5 illustrates an example scenario of determining the optimal test case by the electronic testing device, according to an embodiment as disclosed herein.

FIG. 5 illustrates an example scenario of determining the test case parameters by the electronic testing device for determining the optimal test case, according to an embodiment as disclosed herein. The electronic testing device (100) receives the program code and the test case for determining that a test case that is optimal for testing the UE having the program code. The electronic testing device (100) identifies (502) a field test and a lab test scenarios for the execution the test case. The electronic testing device (100) determines (503) the location coordinates and the time of the day for the field test scenario. Further, the electronic testing device (100) determines that the execution of the test case is success or fail while using the location coordinates and the time of the day for the field test scenario for determining that the test case is optimal for testing.

The electronic testing device (100) determines (504) the name of the test equipment and the test configuration for the lab test scenario. Further, the electronic testing device (100) determines that the execution of the test case is success or fail while using the named test equipment and the configuration for the lab test scenario for determining that the test case is optimal for testing. The electronic testing device (100) determines (505) the profiling parameters includes the access to RO data, the RW data and the CPU cycle count for determining that the test case is optimal for testing. The electronic testing device (100) determines (506) an Original Equipment Manufacturer (OEM) profile includes a memory profile and a performance profile of the UE for determining that the test case is optimal for testing.

The embodiments disclosed herein may be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while various embodiments have been described, those skilled in the art will recognize that the embodiments herein may be practiced with modification within the spirit and scope of the embodiments as described herein and the appended claims.

What is claimed is:

1. A method comprising:
   determining, in a determination by an electronic testing device, one or more locations in a cellular network where a test case is to be executed, a time at which the test case is to be executed at the one or more locations, a number of times the test case is to be executed at the one or more locations, and/or a type of a test equipment on which the test case is to be executed;
   determining, by the electronic testing device, a test context for testing a user equipment based on at least one of the one or more locations where the test case is to be executed, the time at which the test case is to be executed at the one or more locations, the number of times the test case is to be executed at the one or more locations, and the type of the test equipment on which the test case is to be executed;
   determining, by the electronic testing device from a test case repository, an optimal test case for testing the user equipment, based on the test context; and
   executing, by the electronic testing device, the optimal test case to test the user equipment.

2. The method of claim 1, further comprising:
   receiving, by the electronic testing device, test feedback corresponding to the execution of the optimal test case; and
   optimizing, by the electronic testing device, one or more test cases in the test case repository based on the test feedback.

3. The method of claim 1, wherein the one or more locations where the test case is to be executed, the time at which the test case is to be executed at the one or more locations, the number of times the test case is to be executed at the one or more locations, and/or the type of the test equipment on which the test case is to be executed is determined based on at least one of a code coverage metric, a profiling parameter and debug logs from at least one of the user equipment, a simulator and a network.

4. The method of claim 3, wherein the profiling parameter comprises a number of accesses to read-only data, a number of accesses to read-write data, a number of accesses to zero initialized data, a Central Processing Unit (CPU) cycle count, a profiling in time and a memory usage.

5. The method of claim 1, wherein the type of the test equipment comprises at least one of a vendor of the test equipment, a user equipment that communicates only to a single Radio Access Technology (RAT), and a user equipment that communicates to multiple RATs.

6. The method of claim 1, wherein the optimal test case is an optimal test case for testing cellular communication protocol software/hardware.

7. The method of claim 1, wherein the one or more locations comprise geographic locations in the cellular network in which the user equipment communicates.

8. An electronic testing device comprising:
   a memory; and
   a processor, coupled to the memory, and in conjunction with the memory, configured to:
   determine, in a determination, one or more locations in a cellular network where a test case is to be executed, a time at which the test case is to be executed at the one or more locations, a number of times the test case is to be executed at the one or more locations, and a type of a test equipment on which the test case is to be executed;
   determine a test context for testing a user equipment based on at least one of the one or more locations where the test case is to be executed, the time at which the test case is to be executed at the one or more locations, the number of times the test case is to be executed at the one or more locations, and the type of the test equipment on which the test case is to be executed;
   determine, from a test case repository, an optimal test case for testing the user equipment, based on the test context; and
   execute the optimal test case for testing the user equipment.

9. The electronic testing device of claim 8, wherein the processor is further configured to:
   receive test feedback corresponding to the execution of the optimal test case; and
   optimize one or more test cases in the test case repository, based on the test feedback.

10. The electronic testing device of claim 8, wherein the one or more locations where the test case is to be executed, the time at which the test case is to be executed at the one or more locations, the number of times the test case is to be executed at the one or more locations, and/or the type of the test equipment is determined based on at least one of a code coverage metric, a profiling parameter and debug logs from at least one of the user equipment, a simulator and a network.

11. The electronic testing device of claim 10, wherein the profiling parameter comprises a number of accesses to read-only data, a number of accesses to read-write data, a number of accesses to zero initialized data, a Central Processing Unit (CPU) cycle count, a profiling in time and a memory usage.

12. The electronic testing device of claim 8, wherein the type of the test equipment comprises at least one of a vendor of the test equipment, a user equipment that communicates only to a single Radio Access Technology (RAT), and a user equipment that communicates to multiple RATs.

13. The electronic testing device of claim 8, wherein the optimal test case is an optimal test case for testing cellular communication protocol software/hardware.

14. The electronic testing device of claim 8, wherein the one or more locations comprise geographic locations in the cellular network in which the user equipment communicates.

15. A method executed by a processor in conjunction with a memory, the method comprising:
   randomly selecting a modified program code from among a plurality of program code for executing cellular communication protocol software on a user equipment that is to operate in a cellular network;
   determining one or more geographic locations within the cellular network at which a test case is to be executed, and a number of first iterations;
   determining one or more test equipment on which the test case is to be executed, and a number of second iterations; and
   executing the test case with respect to for the number of first iterations at each geographic location for the number of second iterations on each test equipment to test the user equipment.

16. The method of claim 15, wherein the method is performed iteratively, and
   wherein the method further comprises:
   receiving test feedback corresponding to the execution of the test case; and
   optimizing the test case, based on the test feedback.

17. The method of claim 15, further comprising determining a time of day at which the test case is to be executed, wherein the test case is executed at the time of day.

18. The method of claim 15, wherein the one or more geographic locations are determined based on at least one of a code coverage metric, a profiling parameter and debug logs from the user equipment.

19. The method of claim 15, wherein the one or more geographic locations are determined based on a profiling parameter, and
   the profiling parameter comprises at least one of a number of accesses to read-only data, a number of accesses to read-write data, a number of accesses to zero initialized data, a cycle court of a central processing unit (CPU) of the user equipment, and a memory usage of the user equipment.

* * * * *